(12) United States Patent
Baiocchi et al.

(10) Patent No.: US 7,771,782 B2
(45) Date of Patent: Aug. 10, 2010

(54) METHOD OF MANUFACTURING A HIGH IMPACT POLARIZED OPTICAL ELEMENT AND POLARIZED OPTICAL ELEMENT INCLUDING AN INTEGRALLY BONDED POLARIZING FILM

(75) Inventors: Paolo Baiocchi, Parma (IT); Federico Menta, Parma (IT); Matteo Lagasi, Parma (IT)

(73) Assignee: Intercast Europe, srl, Parma (IT)

( * ) Notice: Subject to any disclaimer, the term of this patent is extended or adjusted under 35 U.S.C. 154(b) by 1050 days.

(21) Appl. No.: 11/494,326

(22) Filed: Jul. 25, 2006

(65) Prior Publication Data

US 2007/0024973 A1    Feb. 1, 2007

Related U.S. Application Data

(60) Provisional application No. 60/703,906, filed on Jul. 29, 2005.

(51) Int. Cl.
*G02B 1/04* (2006.01)
*B05D 3/00* (2006.01)

(52) U.S. Cl. ............... 427/163.1; 427/133; 427/372.2; 427/385.5

(58) Field of Classification Search ............. 427/133, 427/163.1, 372.2, 385.5
See application file for complete search history.

(56) References Cited

U.S. PATENT DOCUMENTS

| | | | |
|---|---|---|---|
| 2,644,007 A | 6/1953 | Irwin | |
| 2,680,127 A | 6/1954 | Slocombe | |
| 2,908,703 A | 10/1959 | Latourette | |
| 3,645,927 A | 2/1972 | Andres et al. | |
| 4,818,624 A | 4/1989 | Downey, Jr. | |
| 5,962,617 A | 10/1999 | Slagel | |
| 6,127,505 A | 10/2000 | Slagel | |
| 6,650,473 B2 | 11/2003 | Nakagoshi | |
| 6,734,272 B2 | 5/2004 | Tamura | |
| 7,465,414 B2 * | 12/2008 | Knox et al. | 252/586 |
| 2001/0028435 A1 | 10/2001 | Evans et al. | |
| 2004/0021941 A1 | 2/2004 | Iori et al. | |

FOREIGN PATENT DOCUMENTS

| | | |
|---|---|---|
| DE | 1769367 | 10/1971 |
| WO | WO 01/48539 | 7/2001 |

* cited by examiner

*Primary Examiner*—Thao Tran

(57) ABSTRACT

A method of manufacturing a polarized optical element comprises the steps of:
providing a polarizing film comprising free hydroxyl groups;
placing the polarizing film within a mold cavity:
admitting into the mold cavity a liquid-phase polyurethane-based optical material containing —NCO functional groups reactive with said hydroxyl groups and comprising the following components:
A) a liquid polyisocyanate or polyisocyanate prepolymer having a content of —NCO functional groups comprised between 5 and 50% by weight and an average functionality of 2 to 3,
B) an isocyanate-reactive component comprising at least one organic compound containing at least two aromatic amine groups, and
C) at least one organometallic catalyst;
curing the liquid-phase polyurethane-based optical material to form a polarized optical element.

The method allows to reliably manufacture a polarized optical element comprising an optical part made of polyurethane-based optical material and a polarizing film integrally bonded to the optical part even using thin freestanding polarizing films, such as PVA films, achieving at the same time improved adhesion properties of the polarizing film to the optical material.

46 Claims, 2 Drawing Sheets

METHOD OF MANUFACTURING A HIGH IMPACT POLARIZED OPTICAL ELEMENT AND POLARIZED OPTICAL ELEMENT INCLUDING AN INTEGRALLY BONDED POLARIZING FILM

RELATED U.S. PATENT APPLICATIONS

This application claims the benefit of U.S. Provisional Application Ser. No. 60/703,906 filed on Jul. 29, 2005, entitled "METHOD OF MANUFACTURING A HIGH IMPACT POLARIZED OPTICAL ELEMENT AND POLARIZED OPTICAL ELEMENT INCLUDING AN INTEGRALLY BONDED POLARIZING FILM", which is hereby incorporated in its entirety by reference.

FIELD OF THE INVENTION

The present invention relates to a method of manufacturing high impact polarized optical elements and, in particular, to a method of manufacturing polyurethane polarized optical elements for use in eye-protecting devices such as sunglasses, eyeglasses, masks, visors and the like.

The invention also refers to a polarized optical element including an integrally bonded polarizing film and to an eye-protecting device comprising such a polarized optical element.

The polarized optical element of the invention may be either a semi-finished product from which it is possible to obtain by forming and possibly by beveling an ocular for eye-protecting devices such as for instance a lens of any shape for eyeglasses, or a finished product, such as for instance an ocular in the form of lenses for eyeglasses, either ophthalmic or not, protection masks or portable shields.

In the following description and in the appended claims, the terms: eye-protecting device, and: ocular, are intended to indicate elements suitable respectively to protect the eyes and to allow the vision, as defined by European Standard CEN EN 165.

BACKGROUND OF THE INVENTION

Optical-quality eyewear requires good optical performance. In the selection of optical element materials for use in optical-quality eyewear, the color, weight, and safety of the material is important, as well as good optical performance. Most often, however, the respective properties of different materials necessitate trade-offs among the desired characteristics of the optical element. For instance, glass has very good optical properties, but it is heavy (a dense material) and only impact resistant if thick (resulting in an even heavier lens).

Polymeric thermosetting resins, such as CR-39®, are lighter in weight but are lacking in impact resistance. Polycarbonate, in contrast, is both lightweight and highly impact resistant. Polycarbonate also has a high refractive index. Thus, thinner optical elements can be made utilizing polycarbonate. However, due to lower Abbe Number, polycarbonate exhibits more chromatic aberration than glass, typically resulting in unacceptable off-axis distortion. Moreover, polycarbonate is not resistant to common chemicals such as acetone or gasoline and it is sensitive to the stress cracking phenomenon.

Polyurethane materials have also been used as a material for optical elements. U.S. Pat. Nos. 5,962,617 and 6,127,505 which are herein incorporated by reference, describe a polyurethane resin material for use in lenses, visors and other optical parts. As described in these documents this material may offer improved lens characteristics over conventional materials such as impact resistance, high heat distortion temperature, lightness, very good optical properties, resistance to chemicals and to stress cracking. This material generally comprises the reaction product of a polyisocianate pre-polymer material (component A) and a diamine curing agent (component B). These two components are typically mixed just before the casting procedure and admitted into a mold cavity. Because of the very quick gel time, the casting procedure has to be completed within 30 seconds or less and therefore the feeding flow rate has to be tuned accordingly in order to admit the proper amount of material. For example, the amount of material needed for an eyewear lens is typically between 10 g for a piano lens and 40 g for an ophthalmic lens. A thermal polymerization cycle is then needed to achieve the final properties of the polyurethane material.

Conventional optical elements, for example sunglass lenses manufactured using the aforementioned polyurethane materials, however, fail to properly reduce the effects of glare (i.e. the presence of areas or "hot spots" in the field of vision which are of sufficient brightness to cause visual impediment, such as temporary blurring of vision, or ocular fatigue), since they reduce uniformly the intensity of light throughout the visible spectrum. For example, if a hot spot is ten times brighter than the background ambient light, it will remain ten times brighter if a conventional optical element is used to reduce transmittance of the light, say by 50%. Therefore, conventional optical elements do not significantly eliminate the discomfort to the eye or the blurred vision resulting from the difference in the light intensity between the hot spot and the background.

In order to obviate to this problem, the use of polarized optical elements has been suggested in the art.

Polarized optical elements, in fact, can reduce glare by optically filtering the polarized light significantly more than the non-polarized light. Directly reflected sunlight is partially polarized while ambient light is not, and therefore the transmittance of the reflected sunlight would be reduced much more than that of the ambient light, thereby reducing the discomfort to the eyes.

Generally, polarized optical elements such as polarized lenses are obtained by bonding a polarized film onto the plastic surface of the lens substrate or by introducing such a film into the plastic material of the lens substrate during polymerization or by applying a polarizing coating on a lens substrate. These methods, as well as alternative methods of producing polarized lenses are disclosed in U.S. Pat. No. 6,650,473. the content of which is herein incorporated by reference. Regardless of which particular material is used for the substrate of the optical element, it is preferable in many applications to incorporate a polarizing film into the optical element.

Suitable polarizing films may comprise a variety of different constructions and materials. Such constructions include freestanding or non-laminated polarized films, such as polyvinyl alcohol (PVA) or polyethylene terephthalate (PET) films, films with removable protective sheeting, and films with outer permanent protective coatings or supportive plastic coatings.

Polyurethane, impact-resistant polarized lenses incorporating a polarizing film are described in US patent applications No. 2001/0028435 and 2004/0021941.

The polyurethane lens-forming material described in these references is preferably a material disclosed in U.S. Pat. No. 5,962,617, the content of which is incorporated herein by reference, or a modification thereof, obtained by a procedure called the "full-prepolymer method". The full-prepolymer method essentially consists in preparing a prepolymer containing free —NCO functional groups by reacting a diisocyanate with a slightly less than stoichiometric amount of long and/or short chain polyols and then mixing the prepolymer thus obtained (component A) with a curing agent, such an aromatic amine or a short chain polyol. (component B) which possesses functional groups capable of reacting with the free —NCO functional groups of the prepolymer. This intermediate material is then admitted into a mold made of an appropriate material such as glass or metal, and left to cure by means of a suitable time/temperature cycle.

According to experiments carried out by the present inventors and as confirmed by US patent application No 2001/0028435, however, the attempts to combine a high impact polyurethane polymeric material with a standard PVA polarized film gave negative results, since the film was consistently displaced and bent out of shape during the introduction of the polymeric material. Only polarizing films made of freestanding PET film or wafers comprising transparent plastic sheets laminated on at least one side of a PVA film to impart the PVA a sufficient robustness were used with success.

According to the inventors of US patent application No 2001/0028435, the reason for these negative results would be that it is very difficult to consistently achieve with high yields polarized polyurethane impact-resistant lenses with an embedded freestanding PVA film because during the introduction of the lens-forming resin the PVA film can be displaced due, at least in part, to the quick setting time of the resin itself. Moreover, the inventors of this reference believed that the heat produced by the exothermal reaction during the gelification of the polyurethane resin composition can soften the PVA film making easier the displacement of the film itself.

U.S. Pat. No. 6,734,272 discloses a polarized optical lens obtained from a polyurethane resin composition which is said to have a good resistance to discoloration and durability and a long pot life. According to this reference, in order to take a sufficient time for casting work and overcome the problem related to the short pot life of the mixture of the prepolymer obtained by reacting a polyisocyanate with a polyhydroxy compound (component A) and of the aromatic polyamine (component B), 3,3'-dichloro-4,4'-diaminodiphenylmethane also known as 4,4'-methylene-bis(2-chloroaniline) (MOCA) is used as diamine curing agent (component B). From a practical point of view, however, the use of this diamine curing agent is very undesirable since MOCA is recognized as a very carcinogenic substance and therefore severe health and safety issues are involved. Additionally, resins produced using this diamine curing agent have a very high yellowness, which is another undesirable property.

Accordingly, a need still exists of overcoming the fundamental difficulty of handling the high impact polymeric material and of reproducibly positioning a polarizing film within the final optical element, achieving at the same time adequate optical and mechanical characteristics of the optical element.

SUMMARY OF THE INVENTION

One object of the present invention is that of providing a method of manufacturing polarized optical elements made of high impact polyurethane-based optical material which is capable to overcome the disadvantages inherent in the aforementioned prior art.

More specifically, the present invention aims at providing a method of manufacturing a polarized optical element, in particular a non-planar optical element, which allows to integrally bond a freestanding polarizing film to an optical part of the optical element without suffering from the displacement problems which affect the known manufacturing methods.

Another object of the present invention is that of providing a polarized optical element comprising a lens-forming polyurethane material and a polarizing film having improved properties especially in terms of adhesion at the interface respect to a similar product made using the methods of the prior art.

The present inventors have perceived that in order to manufacture a polyurethane based, high-impact, high optical quality polarized optical elements comprising an optical part and a polarizing film integrally bonded thereto ensuring at the same time that the polarizing film is not displaced nor damaged during the manufacturing operations, a different approach should be undertaken.

More particularly, the present inventors have surprisingly found that it is possible to manufacture in a reproducible and reliable manner a polyurethane based, high-impact, high optical quality polarized optical elements comprising a polarizing film integrally bonded to the polyurethane lens-forming material by providing a polarizing film comprising free hydroxyl groups and by causing these hydroxyl groups to react with a liquid-phase polyurethane-based optical material containing —NCO functional groups reactive with said hydroxyl groups in the presence of a suitable organometallic catalyst.

In the following description and in the appended claims, the expression: "integrally bonded" is used to indicate bonding at molecular level, preferably by means of a chemical reaction, between the polarizing film and the polyurethane lens-forming material.

According to a first aspect thereof, the present invention therefore provides a method of manufacturing a polarized optical element comprising the steps of:

providing a polarizing film comprising free hydroxyl groups;

placing the polarizing film within a mold cavity;

admitting into the mold cavity a liquid-phase polyurethane-based optical material containing —NCO functional groups reactive with said hydroxyl groups and comprising the following components:

A) a liquid polyisocyanate or polyisocyanate prepolymer having a content of —NCO functional groups comprised between 5 and 50% by weight and an average functionality of 2 to 3.

B) an isocyanate-reactive component comprising at least one organic compound containing at least two aromatic amine groups, and C) at least one organometallic catalyst;

curing the liquid-phase polyurethane-based optical material to form a polarized optical element.

For the purposes of the present description and of the claims that follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

The present inventors observed that thanks to the aforementioned combination of features the rate of reaction between the free hydroxyl —OH groups of the polarizing film, for example free hydroxyl —OH groups bound to a main polymeric chain thereof, and the free —NCO functional groups of the liquid-phase polyurethane-based optical material substantially equals the rate of reaction of these —NCO functional groups with the —NH$_2$ groups contained in component B) of the liquid-phase polyurethane-based optical material, thereby causing a stable bonding between the polarizing film and the polyurethane-based optical material.

In a particularly preferred embodiment, the present invention provides a method of manufacturing a polarized optical element, preferably having a non-planar shape, for example substantially spherical or cylindrical, in which a freestanding PVA film is integrally bonded to the polyurethane lens-forming material.

In this way, several advantages, both in terms of cost and in terms of performances of the final product, may be achieved.

The freestanding PVA film, in fact, is much thinner than the polarized multilayered constructs (wafers) comprising transparent plastic sheets bound on at least one side of the PVA film which were used so far by the manufacturing methods of the prior art. The typical thickness of said polarized wafers for use in manufacturing plastic polarized lenses, in fact, generally ranges between 0.4 and 1.0 mm. In sharp contrast, the typical thickness of a freestanding PVA film is in the region of about 30-40 microns. Thus, the final polarized optical element including a freestanding PVA film has basically the mechanical, thermal, chemical and physical properties of the polyurethane based optical material used to manufacture the optical element.

Secondly, the internal tensions generated at the interface between the lens-forming material and the freestanding polarizing PVA film are greatly reduced as compared with those generated by the conventional polarized multilayered constructs, resulting in a better adhesion and integrity of the final product.

According to a second aspect thereof, the present invention also provides a polarized optical element comprising:

an optical part made of polyurethane-based optical material; and a polarizing film integrally bonded to the optical part, wherein the polyurethane-based optical material comprises the reaction product of a liquid-phase material comprising:

a) a liquid polyisocyanate or polyisocyanate prepolymer having a content of —NCO functional groups comprised between 5 and 50% by weight and an average functionality of 2 to 3.

b) an isocyanate-reactive component comprising at least one organic compound containing at least two aromatic amine groups and c) at least one organometallic catalyst.

According to another aspect thereof, the present invention also provides a polarized optical element comprising:

an optical part formed by curing a liquid-phase polyurethane-based optical material; and a polarizing film integrally bonded to the optical part, wherein said polarizing film does not statistically show any delamination upon:

a) an accelerated 120-hours long aging test comprising an alternate exposure to an UV irradiation cycle and a humidity cycle each lasting about 4 hours according to the Q-UV-Panel testing procedure, and b) a thermal shock test comprising five thermal cycles each including the steps of holding the optical element at −20° C. for 4 hours and of conditioning the same at ambient temperature for 4 hours.

Additional features and advantages of the present invention will become more readily apparent from the following non-limitative examples thereof, given hereinbelow for illustration purposes with reference to the accompanying drawing figures. It is to be understood, however, that the following examples and drawings are designed solely for the purpose of illustration and not as a definition of the limits of the invention, for which reference should be made to the appended claims.

BRIEF DESCRIPTION OF THE DRAWINGS

In the drawing figures which are not to scale, and which are merely illustrative.

DETAILED DESCRIPTION OF THE PREFERRED EMBODIMENTS

Figure 1:
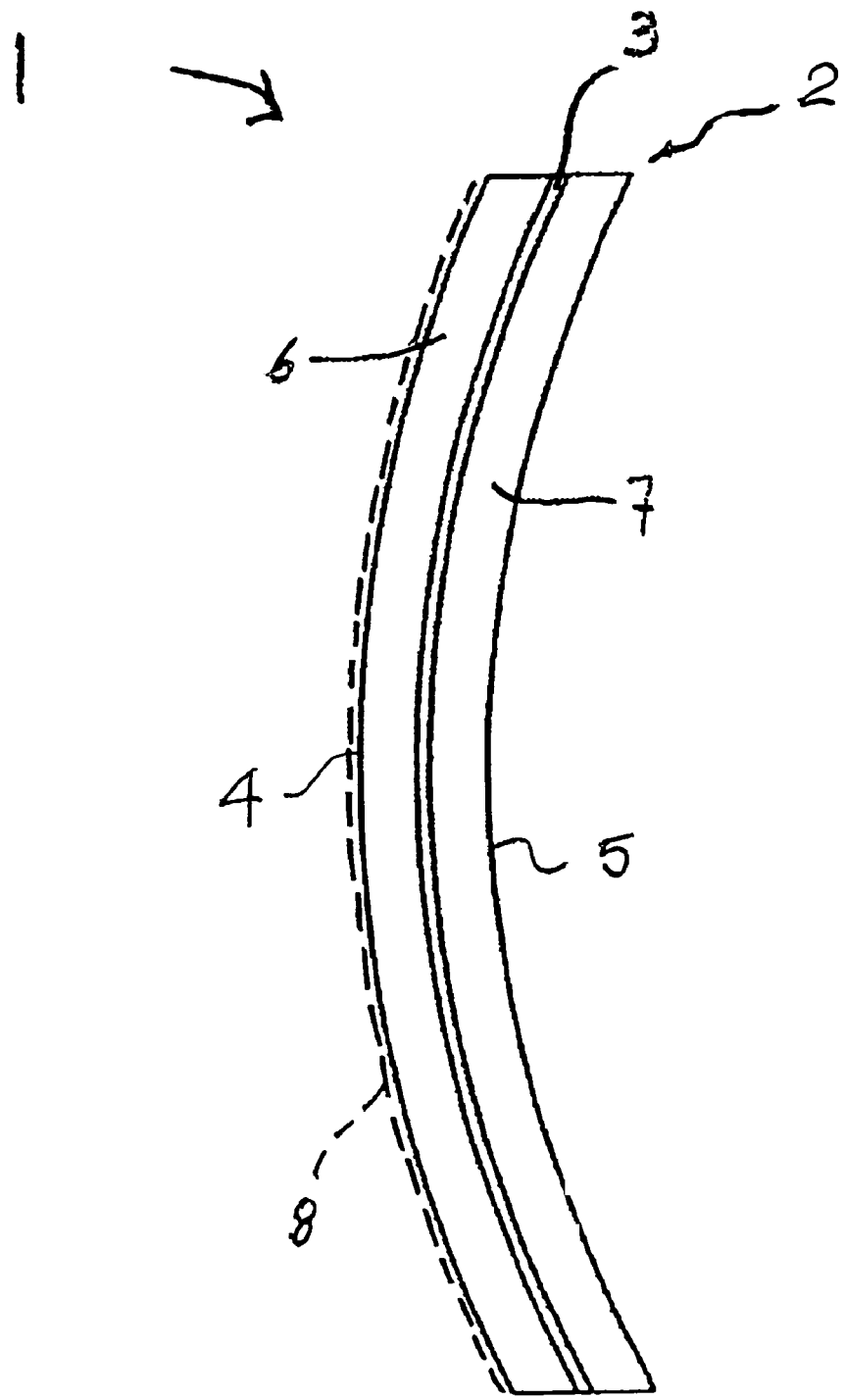
FIG. 1 is a cross sectional view of a polarized optical element manufactured in accordance with one aspect of the present invention.

The present invention generally relates to methods of manufacturing a polarized optical element as well as to optical-quality polarized optical elements comprising a high impact, lightweight, high optical quality polyurethane-based material and a polarizing film. The polarized optical element of the invention advantageously possesses improved adhesion characteristics of the polarizing film to the polyurethane-based optical material, while still maintaining the high impact resistance characteristics of the polyurethane-based optical parts of the prior art and the better optical properties these parts have with respect to similarly impact-resistant polycarbonate constructs.

The term optical element as used herein and in the claims shall be interpreted in its broadest sense to include any type of eye-protecting element or device used to protect or shield the eyes of a wearer, such as, for example, lenses, optical elements, sunglasses, fashion eyewear, sport eyewear, eyeglasses, ophthalmic lenses, visors, shields, face shields for helmets, goggles, and the like (as those terms are customarily used in the eyewear industry).

According to the invention, the polarized optical element may be either a semi-finished product from which it is possible to obtain by shaping and, possibly, by beveling an ocular of any shape, or a finished product, such as for instance a polarized ocular for eye-protecting devices.

As said above, within the framework of the present description and of the following claims, the term: ocular, is used herein to indicate an element suitable to allow vision, such as for instance a lens for eyeglasses, a visor, a protection mask or a portable screen, according to the provisions of European Standard CEN EN 165.

According to a further aspect, the present invention also relates to an eye-protecting device comprising a polarized optical element as described herein.

According to a first embodiment, such eye-protecting device may be essentially constituted by eyeglasses comprising a supporting frame wherein a couple of lens-shaped polarized oculars are mounted.

The lens-shaped polarized oculars may be ophthalmic lenses, i.e. capable of correcting sight defects, or devoid of any corrective capacity.

According to a second embodiment, such eye-protecting device may comprise a polarized ocular in the form of a one-piece polarized visor or unitary lens having a suitable size and shape.

According to the invention, one method for manufacturing a polarized optical element is a casting method which generally comprises placing a polarizing film within a mold cavity, admitting into the mold cavity a liquid-phase polyurethane-based optical material, on one or both sides of the polarizing film, and then curing the latter at a temperature and for a time adapted to cause the polymerization (cross-linking) of the material.

In a preferred embodiment, the polarizing film is preformed to have a non-planar surface, preferably a substantially spherical surface and the mold cavity correspondingly have concave and convex inner surfaces.

In this way, a non-planar optical element in which a freestanding polarizing film is integrally bonded to the lens forming material may advantageously be obtained.

In a first embodiment thereof, the method of the present invention for manufacturing a polarized optical element comprises the steps of:

providing a polarizing film comprising free hydroxyl groups;

placing the polarizing film within a mold cavity:

admitting into the mold cavity a liquid-phase polyurethane-based optical material containing —NCO functional groups reactive with said hydroxyl groups and comprising the following components:

A) a liquid polyisocyanate or polyisocyanate prepolymer having a content of —NCO functional groups comprised between 5 and 50% by weight and an average functionality of 2 to 3.

B) an isocyanate-reactive component comprising at least one organic compound containing at least two aromatic amine groups, and C) at least one organometallic catalyst;

curing the liquid-phase polyurethane-based optical material to form a polarized optical element.

For the purposes of the invention, suitable polarizing films comprising free hydroxyl groups may be films made of a material already having per se free isocyanate-reactive hydroxyl groups or may be films made of a material which does not have per se free hydroxyl groups but which is covered with a layer of a suitable material containing free hydroxyl groups or which is subjected to a suitable treatment so as to form free isocyanate-reactive hydroxyl groups on at least one surface of the film, for example in accordance with the procedures described hereinafter.

Preferably, the polarizing film has a polymeric nature and the aforementioned free hydroxyl groups are bound to a main polymeric chain of the film.

In a preferred embodiment, the polarizing film comprises a PVA film which already possesses per se free isocyanate-reactive hydroxyl groups bound to a main polymeric chain of the film.

In an alternative embodiment, the polarizing film comprises a PET film which does not possess per se isocyanate-reactive hydroxyl groups, but which may be suitably treated to provide any such groups as will be described in the following.

In a preferred embodiment, the polarizing film is a free standing polarizing film having a thickness of from 20 to 400 µm.

Most preferably, the polarizing film is a free standing PVA polarizing film having a thickness of from 20 to 100 µm.

Most advantageously, the inventors observed that the method of the invention allows to manage a thin freestanding PVA film in the manufacture of the polarized optical elements without suffering from the drawbacks of the known methods, such as displacement of the film during casting or damage caused by the heat developed during the curing step.

As said above, the possibility of using a thin freestanding PVA polarizing film allows to achieve several advantages, both in terms of cost and in terms of performances of the final product:

possibility of maintaining substantially unaltered the mechanical, thermal, chemical and physical properties typical of the polyurethane based optical material used to manufacture the optical element;

better adhesion characteristics of the polarizing film and better integrity of the final product due to the lower tension generated at the interface between the film and the optical material used to manufacture the optical element.

possibility of imparting to the optical element non planar shapes avoiding the bending difficulties encountered with thicker polarizing films.

In this respect it is to be noted that freestanding PVA films may be easily thermoformed to a non-planar (i.e. spherical) geometry and do not require any treatment to form hydroxyl functional groups reactive with the —NCO functional groups of the polyurethane-based optical material.

A suitable 30-microns thick freestanding PVA polarized film is for example commercially available from the Company Kurarai, JP.

In one embodiment, the method of the invention may further comprise the step of treating the polarizing film for promoting reaction of the liquid-phase polyurethane-based optical material with the polarizing film.

Such a treatment may either provide at least one surface of the polarizing film with free hydroxyl functional groups capable of reacting with the —NCO functional groups of the polyurethane-based optical material, if the material of the film does not comprise per se any such functional groups (such as for example in the case of PET films), or increase the number and/or type of functional groups capable of reacting with the —NCO functional groups available if hydroxyl reactive groups are already present on at least one surface of the polarizing film (such as for example in the case of PVA films).

A suitable treating of this kind may consist of a surface treating, either physical and/or chemical.

In one embodiment the treating step of the polarizing film comprises applying on at least one surface of the film a reactive coating comprising functional groups (for example hydroxyl functional groups) reactive with the —NCO functional groups of the liquid-phase polyurethane-based optical material.

Preferably, the reactive coating comprises a material selected from the group consisting of polyurethanes, aminosilanes and epoxysilanes.

In another embodiment, which gave outstanding results in terms of adhesion of the polarizing film to the polyurethane lens forming material, the treating step of the polarizing film comprises contacting at least one surface of the film with an aminosilane or an epoxysilanes and causing the aminosilane or epoxysilanes to react with the film thereby to provide at said at least one surface thereof functional groups reactive with the —NCO functional groups of the liquid-phase polyurethane-based optical material.

In the following of the description and in the claims, such a surface will be also referred to as: silylated surface, while the treatment will also be referred to as: silylation treatment.

Such NCO-reactive functional groups may be hydroxyl —OH or amino —NH$_2$ groups when an aminosilane is used or may be hydroxyl —OH groups when an epoxysilane is used.

Suitable aminosilanes and suitable treatments useful in providing the polarizing film with NCO-reactive functional groups according to this embodiment of the invention are described, for example in U.S. Pat. No. 4,818,624 the content of which is herein integrally incorporated by reference.

Suitable aminosilanes comprise a tetravalent silicon atom having at least one non-hydrolyzable group bonded to the silicon atom by a silicon-to-carbon covalent bond and up to three hydrolyzable groups covalently bonded to the silicon atom. Useful compounds can be represented by the formula $$R_n\text{—}SiX_{(4-n)}$$

wherein R is a non-hydrolyzable amino-organic radical; n is an integer of from one to three; and X is a hydrolyzable group. Typically, n will be the integer one and the non-hydrolyzable group will comprise an organic group such as alkyl, aryl, aralkyl or the like substituted with an amino substituent group. Suitable hydrolyzable X groups include alkoxy (e.g., methoxy), acyloxy (e.g., acetyloxy), amino or halo (e.g., chloro). When each X is halo, the organosilane can be reacted directly with hydroxyl groups of the polarizer and hydrolysis for production of silanol groups can be avoided, if desired. Preferred non-hydrolyzable groups are the 3-N-methylaminopropyl and N-2-aminoethyl-3-aminopropyl groups represented in the aminiosilanes of the formula

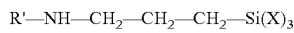

wherein X is a hydrolyzable group such as methoxy and R' is aminoalkyl (e.g., 2-aminoethyl).

Among the epoxysilanes glycidoxypropyl trimethoxysilane is preferred.

Any of a variety of aminosilanes or epoxysilanes as herein described can be used to provide the polarizing film with a silylated surface including hydroxyl and/or amino groups. The particular silane used for the silylation treatment should not, however, when combined with the polarizing film, adversely affect the transmission of the same.

In an alternative embodiment, the treating step of the polarizing film comprises physically treating at least one surface of the film by plasma exposure or by irradiation with UV light rays.

Suitable physical treatments, for example of PET polarizing films are disclosed in International patent application WO 01/48539 the content of which is herein incorporated by reference. Thus, in the case of a PET polarizing film, a physical treatment of at least one surface of the film by plasma exposure or by irradiation with UV light rays may trigger a superficial chemical change with the formation of phenolic groups (aromatic rings with —OH groups) on the treated surface, which can be reactive for strong bonding with the —NCO functional groups of the liquid-phase polyurethane-based optical material.

In still another alternative embodiment, the treating step of the polarizing film comprises mechanically treating at least one surface of the film by forming grooves therein or by roughening the surface. In this way, the superficial area of the film is increased and therefore also the film-optical material contact surface is increased with a consequent improvement of the adhesion properties.

In one embodiment, the method of the invention may further comprise the step of bonding a transparent plastic film to at least one side of the polarizing film.

In this way, the polarizing film may be provided in the form of three-layered or two-layered wafers for improved strength if required. Two layered wafers (alternate material/polarizing film) may provide a supporting coating on one surface, or a single protective covering toward the outer surface of the optical element.

Within the framework of the invention, however, multilayered wafers being thicker and usually laminated are less preferred since they sometimes do not conform to highly curved or non-symmetrically curved shapes and may subsequently separate at the lamination interfaces due to stress fracturing.

An exemplary multi-layered wafer is a polycarbonate/PVA/polycarbonate layered combination less than 1 mm thick.

In this embodiment of the invention, the total thickness of the polarizing film and the transparent plastic film is preferably comprised between 0.1 and 1.2 mm and, still more preferably, between 0.2 and 0.8 mm.

Materials other than polycarbonate for the wafer construct may also comprise poly(methyl methacrylate), polystyrene, acetobutyrrate, cellulose acetate, cellulose triacetate and polyamide.

In a preferred embodiment, the polarizing film has a degree of polarization P equal to at least 45% as measured according to European Standard EN 1836.

In the following description and in the appended claims, the parameter: degree of polarization P is defined as the percent ratio of the difference between the maximum and the minimum values of luminous transmittance as determined with linearly polarized radiation to the sum of the maximum and the minimum values of luminous transmittance as determined with linearly polarized radiation according to European Standard EN 1836.

It has been found that this feature can advantageously reduce or virtually eliminate glare when an object is observed through the optical element against a background having a high level of glare.

More preferably, the polarizing film has a degree of polarization P as measured according to European Standard EN 1836 comprised between 65% and 99.9%.

In this way, the aforementioned advantageous technical effect of glare reduction is optimized.

In one embodiment of the invention, the liquid-phase polyurethane-based optical material comprises the following components:

A) a liquid polyisocyanate or polyisocyanate prepolymer having a content of —NCO functional groups comprised between 5 and 50% by weight an average functionality of 2 to 3, a viscosity of less than 5,000 mPa·s at 25° C., and comprising the reaction product of:
   (1) from 20 to 100% by weight, based on 100% by weight of A), of a (cyclo)aliphatic polyisocyanate having a content of —NCO functional groups of from 32% to 50% by weight and a functionality of about 2, wherein said (cyclo)aliphatic polyisocyanate is selected from the group consisting of 4,4'-dicyclohexylmethane diisocyanate (rMDI), 1,6-hexamethylene diisocyanate (HDI), isophorone diisocyanate (IPDI), 1,4-cyclohexane diisocyanate (CHDI), m-tetramethylxylene diisocyanate (m-TMXDI), and mixtures thereof; and
   (2) from 0 to 80% by weight, based on 100% by weight of A), of at least one organic compound having at least two hydroxyl groups, and a molecular weight of from 62 to 8,000;

and

B) an isocyanate-reactive component comprising:
   1) from 3% to 90% by weight, based on 100% by weight of component B), of at least one organic compound containing at least two aromatic amine groups, and having a molecular weight of from 100 to 1,000; and
   2) from 10% to 97% by weight. based on 100% by weight of component B), of at least one organic compound having at least two hydroxyl groups and a molecular weight of from 62 to 6,000.

In this embodiment of the invention, the liquid-phase polyurethane-based optical material is essentially constituted by a "quasi-prepolymer" two-component system comprising a prepolymer (component A) having free di-isocyanate groups and a curing agent or isocyanate-reactive component (component B) which is a mixture of an aromatic diamine and at least one organic compound having at least two hydroxyl groups.

Suitable "quasi-prepolymer" two-component systems useful in this preferred embodiment of the invention are described, for example, in U.S. Pat. No. 6,562,932 the content of which is herein integrally incorporated by reference.

The present inventors have surprisingly found that by using this quasi-prepolymer system optimum results may be achieved in the manufacture of a polarized high optical quality optical element including a thin freestanding polarizing film integrally bonded to the lens-forming material.

More specifically, outstanding advantages have been achieved in the manufacture of polarized optical elements including an optical part and a freestanding thin PVA polarizing film integrally bonded to the lens-forming material. The inventors, in fact, observed that the thin freestanding PVA polarizing film is not displaced when the liquid-phase polyurethane-based optical material is admitted into the mold cavity and that such thin film may be reliably and reproducibly integrally bonded to the lens-forming material at the most appropriate location, be it located near one of the outer surfaces of the final optical element or be it located at some intermediate point between the outer surfaces of the optical element.

The inventors also observed that by using the aforementioned quasi-prepolymer system, no softening effect of the freestanding PVA film due to the exothermic reaction of the polymer's curing process takes place.

The inventors also observed that by using the aforementioned quasi-prepolymer system, no discoloration or loss of polarization efficiency of the freestanding PVA film occur.

In a preferred embodiment, component A) of the aforementioned "quasi-prepolymer" two-component system has a viscosity at 25° C. comprised between 650 and 2500 mPa·s, most preferably between 650 and 1250 mPa·s.

In a preferred embodiment, component B) of the "quasi-prepolymer" two-component system has a viscosity at 25° C. comprised between 150 and 700 mPa·s, more preferably between 150 and 450 mPa·s.

In this way, notable advantages have been achieved in terms of reliability and reproducibility of the manufacturing process which may be carried out without observing any displacement of the freestanding polarizing film, and especially without observing any displacement of the freestanding, thin PVA Film, when admitting the liquid-phase polyurethane-based optical material into the mold cavity.

In this regard, the inventors believe that a key role in achieving this advantageous technical effect is played by the viscosity characteristics of components A) and B) of the liquid-phase polyurethane-based optical material, which should not preferably exceed the aforementioned maximum values.

Preferably, the components of the liquid-phase polyurethane-based optical material are admitted into the mold at an isocyanate index of 95 to 120.

In the following description and in the appended claims, the expression: "isocyanate index" is used to indicate the quotient of the number of isocyanate groups divided by the number of isocyanate-reactive groups, multiplied by 100.

Within the framework of the embodiment exploiting the "quasi-prepolymer" two-components system, the components of the liquid-phase polyurethane-based optical material are preferably processed at a temperature comprised between 20° C. and 90° C., most preferably between 45° C. and 60° C.

In this way, a good filling of the mold cavity without displacing of the polarized film is achieved having suitable viscosity and pot life.

Preferably, the liquid polyisocyanate or polyisocyanate prepolymer comprises the reaction product of A)(1) a (cyclo) aliphatic polyisocyanate comprising 4,4'-dicyclohexylmethane diisocyanate, with A)(2) at least one organic compound having at least two hydroxyl groups and a molecular weight of from 62 to 8,000.

In this preferred embodiment, the prepolymer preferably comprises the reaction product of A)(1) from about 40 to 80% by weight, based on 100% by weight of A), of 4,4'-dicyclohexyhilethiaiie diisocyanate, with A)(2) from about 20 to 60% by weight, based on 100% by weight of A), of at least one organic compound having at least two hydroxyl groups (preferably 2 to 3 hydroxyl groups) and a molecular weight of from about 62 to 8000 (preferably 300 to 2,000). It is particularly preferred in this embodiment that A)(2) comprise polytetramethylene ether glycols and polycaprolactones.

In this preferred embodiment, component A) comprises from 20 to 100%, preferably 40 to 80%, and more preferably 60 to 80% by weight of A)(1) the (cyclo)aliphatic polyisocyanate component, based on 100% by weight of component A). Suitable (cyclo)aliphatic polyisocyanates for component A)(1) include those having a content of —NCO functional groups of about 32% to about 50% by weight and a functionality of about 2. Suitable (cyclo)aliphatic polyisocyanates are selected from the group consisting of 4,4'-dicyclohexylmethane diisocyanate (rMDI), 1,6-hexamethylene diisocyanate (HDI), isophorone diisocyanate (IPDI), 1,4-cyclohexane diisocyanate (CHDI), m-tetramethylxylene diisocyanate (m-TMXDI), and mixtures thereof. The preferred polyisocyanate for component A)(1) is 4,4'-dicyclohexylmethane diisocyanate, which has an isocyanate group content of about 32% and is commercially available from Bayer Corporation.

In this preferred embodiment, component A)(2), the organic compound, has at least two hydroxyl groups and a molecular weight of from about 62 to 8000. Component A) comprises 0 to 80%. preferably 20 to 60%, and more preferably 20 to 40% by weight of component A)(2), based on 100% by weight of component A). Suitable organic compounds to be used as component A)(2) in accordance with the present invention include those organic compounds having at least 2 hydroxyl groups, preferably 2 to 3 hydroxyl groups and most preferably 2 hydroxyl groups; preferably a molecular weight of 62 to 4,000 and most preferably 300 to 2,000. Examples of suitable compounds to be used component A)(2) include glycols, polyethers, polythioethers, polyesters, polycaprolactones, polycarbonates and polyacetals.

Examples of glycols and other suitable components for A)(2) include compounds known to be suitable as low molecular weight chain extenders as well as low molecular weight diols. Some examples include those compounds with molecular weight of about 350 or less such as, for example, an alkylene ($C_2$-$C_{22}$) glycol, e.g., ethylene glycol, propylene glycol, 1,4-butylene glycol, 1,3-butylene glycol, 1,2-butylene glycol, 1,6-hexanediol, 2-methyl-1,3-propanediol, 2,2,4-trimethylpentane-1,3-diol, neopentyl glycol, 1,10-dodecanediol; poly(alkylene($C_2$-$C_{15}$)glycol), e.g., diethylene glycol, triethylene glycol, tetraethylene glycol, dipropylene glycol, tripropylene glycol; other glycols such as cyclohexane dimethanol, hydrogenated bisphenol A, 1,4-dihydroxy-2-butene, 2,6-dimethyl-1-octene-3,8-diol, hydroquinone bis (2-hydroxy-ethyl)ether, resorcinol bis(2-hydroxyethyl)ether, bis-hydroxyethylene terephthalate; low molecular weight triols with molecular weight of 350 of less such as glycerin, 2-methyl-2-hydroxymethyl-1,3-propanediol, 2,4-dihydroxy-3-hydroxymethylpentane, 1,2,6-hexanetriol, 1,1,1-tris(hydroxymethyl)propane, 2,2-bis(hydroxymethyl)-3-butanol and other aliphatic triols ($C_8$-$C_{20}$), etc., as well as mixtures thereof, and the like. It is also possible that mixtures of the above mentioned compounds with small amounts of monofunctional and/or higher-functional compounds can be used as component A)(2) provided that the above functionality and molecular weight requirements are satisfied.

Suitable polyester polyols may, for example, be prepared from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of possible dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. These dicarboxylic acids may be used individually or else in a mixture with one another. Instead of the free dicarboxylic acids, it is also possible to use the corresponding dicarboxylic acid derivatives, such as esters of dicarboxylic acids with alcohols having from 1 to 4 carbon atoms, or anhydrides of dicarboxylic acids. Examples of di- and polyhydric alcohols are: ethanediol, diethylene glycol, 1,2- and 1,3-propanediol, dipropylene glycol, 1,4-butanediol, 1,5-pentanediol, 1,6-hexanediol, 1,10-decanediol, 1,12-dodecanediol, glycerol and trimethylolpropane. It is also possible to use polyester polyols made from lactones, e.g. epsilon-caprolactone or hydroxycarboxylic acids, e.g. omega-hydroxycaproic acid. Preferred polyester polyols for the present invention include those polyesters which do not have a tendency to crystallize.

Also, suitable compounds to be used as component A)(2) include polycarbonate polyols obtained by a ring-opening polymerization of ethylene carbonate using the low molecular weight diols and low molecular weight triols as an initiator; and natural polyols such as castor oil; polyolefin polyols such as polybutadiene polyol and polyisoprene polyol and hydrated products thereof. These may be used alone or as mixtures of two or more of them.

Other suitable polyols for component A)(2) include polycarbonate diols, which may be obtained by reacting diphenyl or dimethyl carbonate with low molecular weight diols or triols, epsilon-caprolactone-modified diols or triols of the type mentioned above.

Suitable polyesters, polythioethers, polyacetals, polycarbonates and other polyhydroxyl compounds which may be used in accordance with the invention may be found, for example, in High Polymers, Volume XVI, "*Polyurethanes, Chemistry and Technology*" by Saunders-Frisch, Interscience Publishers, New York, London, Vol. 1, 1962, pages 32-42 and 44-54, and Volume 11, 1964, pages 5-6 and 198-199; and in Kunststoff-Handbuch, Vol. VII, Vieweg-Hochtlen, Carl Hanser Verlag, Munich, 1966, pages 45-71.

The polyethers suitable for use in accordance with the present invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Suitable initiator compounds which can be alkoxylated to form component A)(2) in the present invention include, for example, the low molecular weight chain extenders, ethylene glycol, propylene glycol, diethylene glycol, dipropylene glycol, butyl carbitol, butanediol, pentanediol, bisphenol A, neopentyl glycol, trimethyl pentanediol, cyclohexane dimethanol, etc. Mixtures of suitable initiator compounds can also be used provided that the functionality of the resultant polyol mixture is at least about 2.0.

Suitable polyethers include, for example, those compounds based on di-functional starters such as, for example, water, ethylene glycol, propylene glycol, etc. These compounds include copolymers of ethylene oxide and propylene oxide.

Component A) can be a liquid monomeric (cyclo) aliphatic diisocyanate or a liquid polyisocyanate prepolymer. The liquid polyisocyanate prepolymer component A) can be formed, for example, by reacting the diisocyanate A)(1) and organic compound A)(2) having at least 2 hydroxyl groups under a nitrogen blanket or sparge, optionally, in the presence of a catalyst, and heating to about 105° C. for between 4 and 12 hours. The reaction is monitored by % NCO titration. Other suitable processes for the preparation of prepolymers, which are known, can also be used.

In this preferred embodiment, component B), the isocyanate-reactive component, comprises B)(1) at least one organic compound containing at least two aromatic amine groups, and B)(2) at least one organic compound having at least two hydroxyl groups.

Component B) comprises from 3% to 90%, preferably 5 to 60%, and more preferably 10 to 40% by weight of component B)(1), based on 100% by weight of component B).

Component B)(1) comprises at least one organic compound containing at least two aromatic amine groups, and having a molecular weight of about 100 to 1,000. A preferred embodiment of the organic compound containing at least two aromatic amine groups has a molecular weight of about 100 to about 400. It is more preferred that from two to three aromatic amine groups be present in the organic compound B)(1). Most preferred as component B)(1) are those organic compounds having an aromatic amine functionality of about 2 and a molecular weight of about 150 to about 250. The aromatic diamines can contain ether groups and/or ester groups but are preferably free of such groups. Amine-terminated polyethers with the amine-terminating groups as aromatic amine groups are also suitable for use as component B)(1).

Suitable examples of organic compounds containing at least two aromatic amine groups to be used as component B)(1) include aromatic diamine chain extenders having a molecular weight of from 100 to 1,000. The preferred amine chain extenders contain exclusively aromatically bound primary or secondary (preferably primary) amino groups, and preferably also contain alkyl substituents. Examples of such diamines include 1,4-diaminobenzene; 2,4- and/or 2,6-diaminotoluene; 2,4'- and/or 4,4'-diaminodiphenylmethane; 3,3'-dimethyl-4,4'-diaminodiphenylmethane; 3,3'-dichloro-4,4'-diaminodiphenylmethane (MOCA); 1-methyl-3,5-bis (methylthio)-2,4- and/or -2,6-diaminobenzene 1,3,5-triethyl-2,4-diaminobenzene; 1,3,5-triisopropyl-2,4-diaminobenzene: 1-methyl-3,5-diethyl-2,4- and/or -2,6-diaminobenzene (also known as 3,5-diethyl-2,4- and/or -2,6-toluenediamine, collectively "diethyltoluenediamine" or "DETDA"); 4,6-dimethyl-2-ethyl-1,3-diaminobenzene; 3,5, 3',5'-tetraethyl-4,4-diaminodiphenylmethane; 3,5,3',5'-tetraisopropyl-4,4'-diaminodiphenylmethane; 3,5-diethyl-3',5'-diisopropyl-4,4'-diaminodiphenylmethane; 2,4,6-triethyl-m-phenylenediamine (TEMPDA); 3,5-diisopropyl-2,4-diaminotoluene; 3,5-di-sec-butyl-2,6-diaminotoluene; 3-ethyl-5-isopropyl-2,4-diaminotoluene; 4,6-diisopropyl-m-phenylenediamine; 4,6-di-tert-butyl-m-phenylenediamine; 4,6-diethyl-m-phenylenediamine; 3-isopropyl-2,6-diaminotoluene: 5-isopropyl-2,4-diaminotoluene; 4-isopropyl-6-methyl-m-phenylenediamine; 4-isopropyl-6-tert-butyl-m-phenylenediamine; 4-ethyl-6-isopropyl-m-phenylenediamine; 4-methyl-6-tert-butyl-m-phenylenediamine; 4,6-di-sec-butyl-m-phenylenediamine; 4-ethyl-6-tertbutyl-m-phenylenediamine; 4-ethyl-6-sec-butyl-m-phenylenediamine; 4-ethyl-6-isobutyl-m-phenylenediamine; 4-isopropyl-6-isobutyl-m-phenylenediamine; 4-isopropyl-6-sec-butyl-m-phenylenediamine: 4-tert-butyl-6-isobutyl-m-phenylenediamine; 4-cyclopentyl-6-ethyl-m-phenylenediamine; 4-cyclohexyl-6-isopropyl-m-phenylenediamine; 4,6-dicyclopentyl-m-phenylenediamine; 2,2',6,6'-tetraethyl-4,4'-methylenebisaniline; 2,2',6,6'-tetraisopropyl-4,4'-methylenebisaniline(methylenebis diisopropylaniline); 2,2',6,6'-tetra-sec-butyl-4,4'-methylenebisaniline; 2,2'-dimethyl-6,6'-di-tert-butyl-4,4'-methylenebisaniline; 2,2'-di-tert-butyl-4,4'-methylenebisaniline; and 2-isopropyl-2',6'-diethyl-4,4'-methylenebisaniline. Such diamines may, of course, also be used as mixtures.

It is particularly preferred that component B)(1), the organic compound containing at least two aromatic amine groups, comprise a compound selected from the group consisting of an isomer of diethyltoluenediamine, a mixture of isomers of diethyltoluenediamine, an isomer of dimethylthiotoluenediamine, and a mixture of isomers of dimethylthiotoluenediamine.

The isocyanate reactive component B) additionally comprises component B)(2) one or more organic compounds having at least two hydroxyl groups. Component B) comprises from 10% to 97%, preferably 40 to 95%, and more preferably 60 to 90% by weight, based on 100% by weight of component B), of at least one organic compound having at least two hydroxyl groups and a molecular weight of about 62 to 6,000. More preferably, the organic compound contains two or three hydroxyl groups and has a molecular weight of 62 to 4,000. It is most preferred that B)(2) has an hydroxyl functionality of two and a molecular weight of 90 to 4,000. The organic compound having at least two hydroxyl groups can contain a glycol or a polyol or a mixture thereof. Examples of component B)(2) include compounds having at least two hydroxyl groups including polyethers, polythioethers, polyesters, polycaprolactones, glycols, polycarbonates and polyacetals.

Preferably, the organic compound B)(2) having at least two hydroxyl groups has a functionality of about 3 or less.

In one embodiment, the organic compound B)(2) having at least two hydroxyl groups comprises a low molecular weight glycol, more preferably having a molecular weight less than 500.

Examples of glycols and other suitable components for B)(2) include compounds known to be suitable as low molecular weight chain extenders as well as low molecular weight diols, such as those indicated above for component A)(2). Also in this case, it is also possible that mixtures of the above mentioned compounds with small amounts of monofunctional and/or higher-functional compounds can be used as component A)(2) provided that the above functionality and molecular weight requirements are satisfied.

In one embodiment, the organic compound B)(2) having at least two hydroxyl groups comprises a high molecular weight polyol, more preferably having a molecular weight greater than 500.

In one embodiment, the organic compound B)(2) having at least two hydroxyl groups comprises a mixture of a glycol and a polyol.

Suitable polyester polyols may, for example, be prepared from organic dicarboxylic acids having from 2 to 12 carbon atoms, preferably aliphatic dicarboxylic acids having from 4 to 6 carbon atoms, and polyhydric alcohols. preferably diols, having from 2 to 12 carbon atoms, preferably from 2 to 6 carbon atoms. Examples of possible dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. These dicarboxylic acids may be used individually or else in a mixture with one another. Instead of the free dicarboxylic acids, it is also possible to use the corresponding dicarboxylic acid derivatives, such as esters of dicarboxylic acids with alcohols having from 1 to 4 carbon atoms, or anhydrides of dicarboxylic acids. Examples of di- and polyhydric alcohols are: ethanediol, diethylene glycol, 1,2- and 1,3-propanediol, dipropylene glycol, 1,4-butanediol, 1,5-pentanediol, 1,6-hexanediol, 1,10-decanediol, 1,12-dodecanediol, glycerol and trimethylolpropane. It is also possible to use polyester polyols made from lactones, e.g. epsilon-caprolactone or hydroxycarboxylic acids, e.g. omega-hydroxycaproic acid.

Also suitable as component B)(2), compounds having at least two hydroxyl groups, are polycarbonate polyols obtained by a ring-opening polymerization of ethylene carbonate using the low molecular weight diols and low molecular weight triols as an initiator; and natural polyols such as castor oil; polyolefin polyols such as polybutadiene polyol and polyisoprene polyol and hydrated products thereof. These may be used alone or as mixtures of two or more of them.

Other suitable polyols for component B)(2) include polycarbonate diols, which may be obtained by reacting diphenyl or dimethyl carbonate with low molecular weight diols or triols, epsilon-caprolactone-modified diols or triols of the type mentioned above.

Suitable polyesters, polythioethers, polyacetals, polycarbonates and other polyhydroxyl compounds which may be used in accordance with the invention may be found, for example, in High Polymers, Volume XVI, "*Polyurethanes, Chemistry and Technology*" by Saunders-Frisch, Interscience Publishers, New York, London, Vol. 1, 1962, pages 32-42 and 44-54, and Volume 11, 1964, pages 5-6 and 198-199; and in Kunststoff-Handbuch, Vol. VII, Vieweg-Hochtlen, Carl Hanser Verlag, Munich, 1966, pages 45-71.

The polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably ethylene oxide and propylene oxide, in admixture or successively to components containing reactive hydrogen atoms such as water, alcohols or amines. Suitable initiator compounds which can be alkoxylated to form component B)(2) in the present invention include, for example, the low molecular weight chain extenders, ethylene glycol, propylene glycol, diethylene glycol, dipropylene glycol, butyl carbitol, butanediol, pentanediol, bisphenol A, neopentyl glycol, trimethyl pentanediol, cyclohexane dimethanol, etc. Mixtures of suitable initiator compounds can also be used provided that the functionality of the resultant polyol mixture is at least about 2.0.

Suitable polyethers include, for example, those compounds based on di-functional starters such as, for example, water, ethylene glycol, propylene glycol, etc. These compounds include copolymers of ethylene oxide and propylene oxide.

In another embodiment of the invention, the liquid-phase polyurethane-based optical material comprises the following components:

A) a liquid polyisocyanate prepolymer having a content of —NCO functional groups comprised between 5 and 50% by weight and an average functionality of 2 to 3, and comprising the reaction product of:
  (1) an aliphatic or cycloaliphatic diisocyanate; and
  (2) at least one —OH containing intermediate having a weight average molecular weight of from 400 to 2000 selected from the group consisting of polyester glycols, polycaprolactone glycols, polyether glycols, polycarbonate glycols, and mixtures thereof in an equivalent ratio of 2.5 to 4.5 NCO/1.0 OH;

and

B) an isocyanate-reactive component comprising:
  1) at least one aromatic diamine curing agent selected from the group consisting of 2,4-diamino-3,5-diethyl-toluene, 2,6-diamino-3,5-diethyl-toluene, the compounds having the formula:

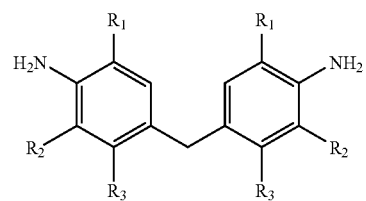

wherein $R_1$ and $R_2$ are each independently selected from the group consisting of methyl, ethyl, propyl and isopropyl groups, and $R_3$ is selected from the group consisting of hydrogen and chlorine, and mixtures thereof.

In this embodiment of the invention, the liquid-phase polyurethane-based optical material is essentially constituted by a "full-prepolymer" two-component system comprising a prepolymer (component A) having free di-isocyanate groups and a curing agent or isocyanate-reactive component (component B) comprising an aromatic diamine.

Suitable "full-prepolymer" two-component systems useful in this preferred embodiment of the invention are described for example in U.S. Pat. Nos. 5,962,617 and 6,127,505 the content of which is herein integrally incorporated by reference.

Preferably, the components A) and B) of the liquid-phase polyurethane-based optical material are admitted into the mold at an equivalent ratio of 0.85 to 1.02 $NH_2/1.0$ NCO.

In this way, the amount of free $—NH_2$ or $—NCO$ reactive groups remaining in the cured optical material may advantageously be minimized.

The aliphatic or cycloaliphatic diisocyanates which can be used to prepare the polyurethane material of this embodiment of the invention include dicyclohexylmethane diisocyanates and preferably isomeric mixtures thereof comprising at least 20 percent (that is 20-100 per cent) of the trans,trans isomer of 4,4'-methylenebis(cyclohexyl isocyanate), hereinafter referred to as "PICM" (paraisocyanato cyclohexylmethane). Other components usually present in the mixtures of position and/or stereoisomers of the dicyclohexylmethane diisocyanate used in this invention are the cis,trans and cis,cis isomers of PICM and stereoisomers of 2,4'-methylenebis(cyclohexyl isocyanate). These, as well as the trans,trans PICM isomer, are present in amounts which can be controlled by the procedures used to prepare the dicyclohexylmethane diisocyanate. Preferred diisocyanates are isomeric PICM mixtures. An especially preferred mixture contains not less than about 20 percent of the trans,trans isomer and no more than about 20 percent of the cis,cis isomer of 4,4'-methylenebis(cyclohexyl isocyanate).

The PICM used in this embodiment of the invention is prepared by phosgenating the corresponding 4,4'-methylenebis(cyclohexyl amine) (PACM) by procedures well known in the art, as disclosed in, e.g., U.S. Pat. Nos. 2,644,007, 2,680,127, and 2,908,703, which are incorporated herein by reference.

Additional aliphatic and cycloaliphatic diisocyanates that may be used include 3-isocyanato-methyl-3,5,5-trimethyl cyclohexyl-isocyanate ("IPDI") from Arco Chemical and meta-tetramethylxylene diisocyanate (1,3-bis(1-isocyanato-1-methylethyl)-benzene), which is sold by Cytec Industries Inc. under the trade name TMXDI®. These additional compound may be used alone or mixture with each other or with 4,4'-methylenebis(cyclohexyl isocyanate).

Within the framework of this embodiment of the invention, references to aliphatic and cycloaliphatic diisocyanates are intended to encompass TMXDI® and compounds of the formula $R—(NCO)_2$ where R is an aliphatic group or a cycloaliphatic group and otherwise does not embrace aromatic diisocyanates.

The OH-containing intermediates which can be used to prepare the polyurethane material of this embodiment of the invention preferably have a weight average molecular weight of from 400 to 2000, most preferably from 400 to 1000, and include polyester glycols polycaprolactone glycols, polyether glycols, and polycarbonate glycols.

Polyether glycols and polyester glycols having molecular weights of from 600 to 900 are especially effective. Polyether glycols that can be used include polytetramethylene ether glycols having a weight average molecular weight of from 500 to 1000.

Polyester glycols that can be used include the esterification products of one or more dicarboxylic acids having four to ten carbon atoms, such as adipic, succinic and sebacic acids, with one or more low molecular weight glycols having two to ten carbon atoms, such as ethylene glycol, propylene glycol, diethylene glycol, 1,4-butanediol, neopentyl glycol, 1,6-hex-anediol and 1,10-decanediol. Preferred polyester glycols are the esterification products of adipic acid with glycols of two to ten carbon atoms.

Polycaprolactone glycols that can be used include the reaction products of E-caprolactone with one or more of the low molecular weight glycols listed above. In addition, useful OH-containing intermediates may include teresters produced from one or more low molecular weight dicarboxylic acids, such as adipic acid, and caprolactones with one or more of the low molecular weight glycols listed above.

The preferred polyester glycols and polycaprolactone glycols can be derived by well known esterification or transesterification procedures, as described, for example, in the article D. M. Young, F. Hostettler et al., "Polyesters from Lacione", Union Carbide F-40, p. 147.

Polyether glycols that can be used include polytetramethylene ether glycol.

Polycarbonate glycols that can be used include aliphatic polycarbonate glycols. Preferred aliphatic polycarbonate glycols are those manufactured and sold by Enichem under the trade name RAVECARB® 102 (molecular weight=1,000) and RAVECARB® 106 (molecular weight=2,000).

The most preferred OH-containing intermediates are: (a) esterification products of adipic acid with one or more diols selected from 1,4-butanediol, 1,6-hexanediol, neopentyl glycol, and 1,10-decanediol; (b) reaction products of E-caprolactone with one or more diols selected from 1,4-butane diol, 1,6-hexane diol, neopentyl glycol, and 1,10-decanediol; (c) polytetramethylene glycol; (d) aliphatic polycarbonate glycols, and (e) mixtures of such OH-containing intermediates.

The preferred aromatic diamine curing agents for use in preparing the polyurethane material of this embodiment of the invention are 1-methyl-3,5-diethyl-2,4-and/or- 2,6-diaminobenzene (collectively "diethyltoluenediamine" or "DETDA"), which are sold by Albemarle Corporation under the trade name ETHACURE® 100. DETDA is a liquid at room temperature with a viscosity of 156 cst at 25° C. DETDA is isomeric, with the 2,4-isomer range being 75-81 percent while the 2,6-isomer range is 18-24 percent.

The color stabilized version of ETHACURE® 100, which is available under the name ETHACURE® 100S, is particularly preferred.

Additional diamine curing agents for use in the present invention include compounds having the following structural formula:

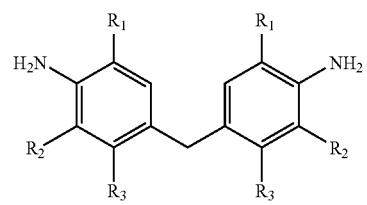

wherein $R_1$ and $R_2$ are each independently selected from the group consisting of methyl, ethyl, propyl and isopropyl groups, and $R_3$ is selected from the group consisting of hydrogen and chlorine, and mixtures thereof.

Examples of the such additional diamine curing agents are the following compounds, manufactured by Lonza Ltd. (Basel, Switzerland):
LONZACURE® M-DIPA $R_1=C_3H_7$; $R_2=C_3H_7$; $R_3=H$
LONZACURE® M-DMA: $R_1=CH_3$; $R_2=CH_3$; $R_3=H$
LONZACURE® M-MEA: $R_1=CH_3$; $R_2=C_2H_5$; $R_3=H$
LONZACURE® M-DEA: $R_1=C_2H_5$; $R_2=C_2H_5$; $R_3=H$
LONZACURE® M-MIPA: $R_1=CH_3$; $R_2=C_3H_7$ $R_3=H$
LONZACURE® M-CDEA: $R_1=C_2H_5$; $R_2=C_2H_5$; $R_3=Cl$ wherein $R_1$, $R_2$ and $R_3$ refer to the above chemical formula. Among these, the preferred diamine curing agent is 4,4'-methylenebis(3-chloro-2,6-diethylaniline), (LONZACURE® M-CDEA), which is also available from Air Products and Chemical. Inc. (Allentown, Pa.). The foregoing diamine curing agents may be used in addition to or in place of DETDA, as a polyurethane curing agent.

Suitable organometallic catalysts C) include organic metal compounds, especially organic tin and bismuth compounds. Suitable organic tin compounds include those containing sulfur, such as dioctyl tin mercaptide (German Auslegeschrift 1,769,367 and U.S. Pat. No. 3,645,927), and, preferably, tin (II) salts of carboxylic acids, such as tin(II) acetate., tin(II) octoate, tin(II) ethylhexoate, and tin(II) laurate, as well as tin(IV) compounds, such as dibutyltin dilaurate, dibutyltin dichloride, dibutyltin diacetate, dibutyltin maleate, and dioctyltin diacetate. Suitable bismuth compounds include bismuth neodecanoate, bismuth versalate, and various bismuth carboxylates known in the art.

The preferred organometallic catalyst comprises a tin(IV) catalyst comprising dibutyltin dilaurate, dimethyltin dilaurate, or mixtures thereof.

Any of the above-mentioned catalysts may, of course, be used as mixtures. Further representatives of catalysts to be used according to the invention and details concerning their mode of action are described in Kunststoff Handbuch, Volume VII, published by Vieweg and Huchtlen, Carl Hanser Verlag, Munich, 1966, for example, on pages 96 to 102.

The organometallic catalyst can be used in a quantity ranging from about 0.002 to about 5%, preferably from about 0.01 to about 1% by weight, based on the total quantity of components (A), (B), and (C).

In one embodiment, the method of the invention may further comprise the step of adding to the liquid-phase polyurethane-based optical material at least one additive known to be useful in the manufacture of optical elements made of polyurethane materials. Preferably, said at least one additive is selected from the group consisting of: surface-active additives such as emulsifiers, light stabilizers, heat stabilizers, antioxidants, ultraviolet light absorbers, antiyellowing additives, mold release agents, dyes, pigments, flexibilizing additives, and mixtures thereof.

For example, one or more anti-oxidants may be added to the prepolymer in an amount of up to 5% by weight based on total reactants. Anti-oxidants that are useful in the present invention include those of the multifunctional hindered phenol type. One example of a multifunctional hindered phenol type anti-oxidant is IRGANOX® 1010, available from Ciba Geigy.

A UV-stabilizer may also be added to the prepolymer, either prior to or during the curing step, in an amount up to about 5.0%, preferably about 0.5 to 4.0% by weight based on total reactants. UV-stabilizers that are useful in the present invention include benzotriazoles. Examples of benzotriazole UV-stabilizers include CYASORB® 5411 and CYASORB® 3604 available from American Cyanamid and TINUVIN® 326 and TINUVIN® 328 available from Ciba Geigy.

In addition to the benzotriazoles, a hindered amine light stabilizer may be added to further enhance UV protection. An example of a hindered amine light stabilizer is TINUVIN® 765. available from Ciba-Geigy.

A triol may be added to the prepolymer in an amount sufficient to produce about one percent cross-linking based upon equivalents of reactants, for example 4 to 8% by weight based on total reactants. Triols that are useful in the present invention include trimethylol ethane and trimethylol propane. The addition of a triol to the prepolymer increases the heat distortion temperature and in some cases improves the ballistic properties of the cured polyurethane.

In accordance with the invention, the ingredients of components A) and B) of the liquid-phase polyurethane-based optical material may be prepared in any conventional way known to those skilled in the art before admission into the mold cavity. For example, if components A) and B) are constituted by more than one ingredient the various ingredients are thoroughly mixed before admission into the mold cavity.

Preferably, the ingredients of components A) and B) of the liquid-phase polyurethane-based optical material are maintained prior to use as two separate (optionally pre-mixed) components held at slightly elevated temperature (50-70° C.) (component A) and, respectively, at room temperature (20-27° C.) (components B and C). When combined at the point of use the mixture of components A) and B) exothermically reacts and begins to solidify within a limited period of time, generally between 30 and 360 seconds as a function of the temperature at which the components are admitted.

In one embodiment, the optical element is formed by admitting the liquid-phase polyurethane-based optical material about one side of the polarizing film.

In this way, the polarizing film may be positioned at or near one of the outer surfaces of the final optical element if the characteristics of the film so allow.

In another embodiment, the optical element is formed by admitting the liquid-phase polyurethane-based optical material about each side of the polarizing film.

Within the framework of this embodiment, the optical element is most preferably formed by simultaneously admitting the liquid-phase polyurethane-based optical material about each side of the polarizing film.

In this way, the polarizing film may be positioned at any desired location between the outer surfaces of the final optical element, i.e. within the bulk of the optical element. This manufacturing approach may be used for better environmental and wear protection for delicate polarizing films (such as PVA films) or for demanding applications. For example, certain applications may benefit uniquely from protecting the polarizing film securely within the impact resistant polymeric material. These could include safety or shielding helmets, goggles, or glasses, or display and window applications that may be subjected to high wind, pressure, vacuum, or other harsh conditions.

The curing step of the method may be carried out in accordance with procedures and operating parameters known to those skilled in the art.

For example, the curing step may require several hours at room temperature.

In the following description and in the appended claims, the term: room temperature, is intended to indicate a temperature comprised between 20 and 27° C.

A controlled elevated temperature, or a ramped increase to an elevated temperature, is preferred for more reproducible production times and final optical and mechanical properties. Preferably, the elevated temperature is maintained in the range of 90-130° C.

Higher temperatures may result in yellowing of the material from reactive decomposition, while lower temperatures entail a corresponding decrease of the reaction kinetics.

Two exemplary curing steps of the method are:
1. One-step Curing:

the mold cavity is filled at room temperature (20-27° C.) with the liquid-phase polyurethane-based optical material. Within 10 minutes (when polyurethane material has gelled to inhibit flow during, movement), place the mold assembly in an oven at 100° C. Cure in mold assembly for 16-18 hours, then remove the optical part from the assembly; or 2. Two-step Curing First curing: the mold cavity is filled at room temperature (20-27° C.) with the liquid-phase polyurethane-based optical material. Place assembly in oven at 100° C. for 3 hours. Post curing: remove optical part from assembly and continue curing the optical element for at least 6 hours at a temperature of at least 90° C. in a suitable oven (for example for an additional 15 hours at 100° C.).

The curing step may be the final step in the manufacturing method if the resultant optical element is sufficiently robust for its intended optical environment. The polarizing film chosen, its location in the optical element and the intended use of the optical element determine sufficient robustness. For instance, one could not use a PVA polarizing film and end the manufacturing method after the curing step if the PVA film is located at one of the outer surfaces of the optical element if the latter is to be exposed to water or high humidity in its intended use. In this case, in fact, the polarized part would lose efficiency and the polarizing film may deform or delaminate under humid conditions.

In one embodiment, the method of the invention may further comprise the step of applying a scratch-resistant or hard coating on at least one side of the polarized optical element.

Such coatings are normally applied to eyewear and other exposed optical elements to increase their lifetime in standard use or to enhance their optical properties. These coatings may be applied to front, back, or all surfaces (including edges) as needed to protect or enhance the parts. Similarly, different coatings may be applied to different surfaces (e.g., a scratch resistant coating on one surface, and a tinted or mirror coating on another).

Several commercial coatings for enhanced scratch, rub and wear resistance, as well as increased environmental stability, are available for ophthalmic lenses or other optical parts. Such coatings may be applied in the liquid state by any of the methods used in coating technology such as, for example, spray coating, spread coating, curtain coating, dip coating or roll-coating. Depending on the chemistry of the coating solution, the liquid film is converted to a harder, solid coating by thermal, ultraviolet, infrared or other means of irradiation, reactive initiators or other reactive methods.

In one embodiment, the method of the invention may further comprise the step of applying a tintable coating, a reflective coating, an antireflective coating or a hydrophobic coating, or any combination thereof, on at least one side of the polarized optical element.

Such coatings may be applied individually or sequentially to at least one surface of the optical element of the present invention.

An antireflective coating, e.g., a monolayer or multilayer of metal oxides, metal fluorides, or other such materials, may be deposited on at least one side of the polarized optical element, e.g., lenses, of the present invention by means of vacuum deposition, sputtering, or any other method known to those skilled in the art.

Vacuum-deposited coatings may be applied as an alternate to the liquid coating, or in addition to cured liquid coatings.

The aforementioned coatings may provide additional protection from physical wear, environmental degradation, or further control of the optical properties of the part. For instance, the liquid or vacuum deposited coatings may alter light throughput in a particular energy region to give anti-reflective or reflective (mirror) properties, alter the perceived color of the part, or reduce exposure to emissions such as infrared or ultraviolet, emissions.

In an additional aspect, the present invention relates to a polarized optical element which may be manufactured by means of the method described above and which comprises an optical part made of polyurethane-based optical material and a polarizing film integrally bonded to the optical part, wherein the polyurethane-based optical material comprise the reaction product of the above described liquid-phase polyurethane-based optical material comprising:

a) a liquid polyisocyanate or polyisocyanate prepolymer having a content of —NCO functional groups comprised between 5 and 50% by weight and an average functionality of 2 to 3, b) an isocyanate-reactive component comprising at least one organic compound containing at least two aromatic amine groups, and c) at least one organometallic catalyst.

The polarized optical element of the invention shows improved adhesion properties of the polarizing film, especially when the latter is a freestanding PVA film, at the interface with the polyurethane-based optical material with respect to similar products of the prior art.

More specifically, the polarized optical element of the invention does not statistically show any delamination upon:

a) an accelerated 120-hours long aging test comprising an alternate exposure to an UV irradiation cycle and a humidity cycle each lasting about 4 hours according to the Q-UV-Panel testing procedure. In this testing procedure, the UV lamp has a maximum peak at 340 nm of irradiance at around 0.75 W/m$^2$/nm. The lens surface temperature reaches about 55° C., the humidity level during the humidity cycle is very close to saturation. During this test the surface temperature of the lens reaches about 55° C. and the humidity reaches values very close to saturation (99% RH), b) a thermal shock test comprising five thermal cycles each including the steps of holding the optical element at −20° C. for 4 hours and of conditioning the same at ambient temperature for 4 hours.

In the following description and in the appended claims, the expression: does not statistically show any delamination, is used to indicate that the polarizing film is not detached neither totally nor in part from the optical part made of polyurethane material in not more than 1% of the total number of tested optical elements, the total number being equal to 100.

Preferably, in the polarized optical element of the invention the polarizing film does not statistically show any delamination upon a weathering test consists in outdoor exposure for 60 days at Lat 44°50'47"N and Long. 10°21'39"E during the months of June and July.

In a preferred embodiment, the polarizing film of the polarized optical element of the invention does not statistically show any delamination upon a wedge test carried out as follows.

In a first step of the testing method the edge of the optical element is milled using a shaped mill suitable to achieve a round-shaped groove with a diameter of 1.5 mm. The milling is achieved using a typical machine for cutting and edging the lenses and the groove is formed at the interface between the polarizer and the lens material.

In a second step, the grooved optical element is then pressed on a metallic steel bar having a diameter of 1.0 mm housed in the groove formed along the edge of the optical element. The pressure should not generate visible delamination at the interface.

According to the invention the polarized optical element may be either a semi-finished product from which it is possible to obtain by shaping and, possibly, by beveling an ocular of any shape, or a finished product, such as for instance a polarized ocular for eye-protecting devices.

As said above, within the framework of the present description and of the following claims, the term: ocular, is used herein to indicate an element suitable to allow vision, such as for instance a lens for eyeglasses, a visor, a protection mask or a portable screen, according to the provisions of European Standard CEN EN 165.

If the polarized optical element is a finished product, it may be obtained starting from a respective semi-finished product by means of shaping and possibly by beveling operations known per se.

Similarly, optical elements for displays or windows could be prepared to final shape and size, or manufactured via the method described above as large parts that are subsequently cut, shaped, formed or further processed to final articles.

According to a further aspect, the invention also relates to an eye-protecting device which is polarized to reduce glare and comprising a polarized optical element as described hereinabove.

According to a first embodiment, such eye-protecting device is essentially constituted by eyeglasses comprising a supporting frame wherein a couple of lens-shaped polarized oculars are mounted.

The lens-shaped polarized oculars may be ophthalmic lenses, i.e. capable of correcting sight defects, or devoid of any corrective capacity.

According to a second embodiment, such eye-protecting device comprises a polarized ocular in the form of a one-piece polarized visor or unitary lens having a suitable size and shape.

A non limitative preferred embodiment of a polarized optical element according to the invention and of a mold and gasket assembly useful in the manufacturing method of the invention is described hereinbelow with reference to annexed FIGS. 1 and 2.

FIG. 1 illustrates an optical-quality non-planar polarized optical element 1, particularly a polarized lens, comprising a high impact, lightweight, high-optical quality polymeric construct or lens substrate 2 and a polarizing film 3 bonded thereto. The optical element 1 has been manufactured according to one of the embodiments disclosed and illustrated herein, such that the polarizing film 3 may be "integrally bonded" (bonded at molecular level) to the optical construct or lens substrate 2. Advantageously, the optical element 1 has improved impact resistance over conventional thermoset resin parts, as well as better optical properties than similarly impact-resistant polycarbonate constructs.

Turning in detail to FIG. 1, the polarizing film 3 is located at an intermediate point between the front surface 4 and the rear surface 5 of the lens substrate 2. The polarizing film 3 may alternatively be bonded at the front surface 4, however, being bonded within the lens substrate 2 film 3 is interposed between first and second members 6, 7 of the lens substrate 2. First and second members 6 and 7 are obtained from the aforementioned liquid-phase polyurethane based optical material placed in contact with the polarizing film 3 and allowed to cure according to the procedures described above.

In this manner, the first member 6 of the lens substrate 2 protects the film 3 such that there may be no need to hardcoat it. However, to protect the first member 6 from abrasion and undue wear, member 6 may optionally be hardcoated. As the hard coating 8 is optional, it is shown in dashed lines.

As described above, if the polarizing film 3 does not contain per se any free hydroxyl groups, for example bound to its main polymeric chain, one or both sides of the film may be surface treated, either physically and/or chemically, to effect an integral bond between the film 3 and the liquid-phase polyurethane based optical material used to manufacture of the lens substrate 2.

As described above, the polarizing film 3 may comprise a variety of different constructions and materials. Such constructions include freestanding or non-laminated polarized films, films with removable protective sheeting, and films with outer permanent protective coatings or supportive plastic layers.

Surprisingly, the inventors found that in accordance with the method of the invention no adverse effects on the polarizing film 3 were observed, even in the case of freestanding delicate PVA films, upon admitting the liquid-phase polyurethane based optical material into the mold cavity or as a consequence of the subsequent rapid exothermic polymerization reaction of the present high impact polyurethane based optical material.

Also, the inventors surprisingly found that the polarized optical element of the invention shows improved adhesion properties of the polarizing film 3 to the polyurethane material forming the lens substrate 2.

As will be apparent more clearly in the following, best adhesion results were achieved with a PVA polarizing film having at least one silylated surface obtained according to the silylation treatment described above.

Figure 2:
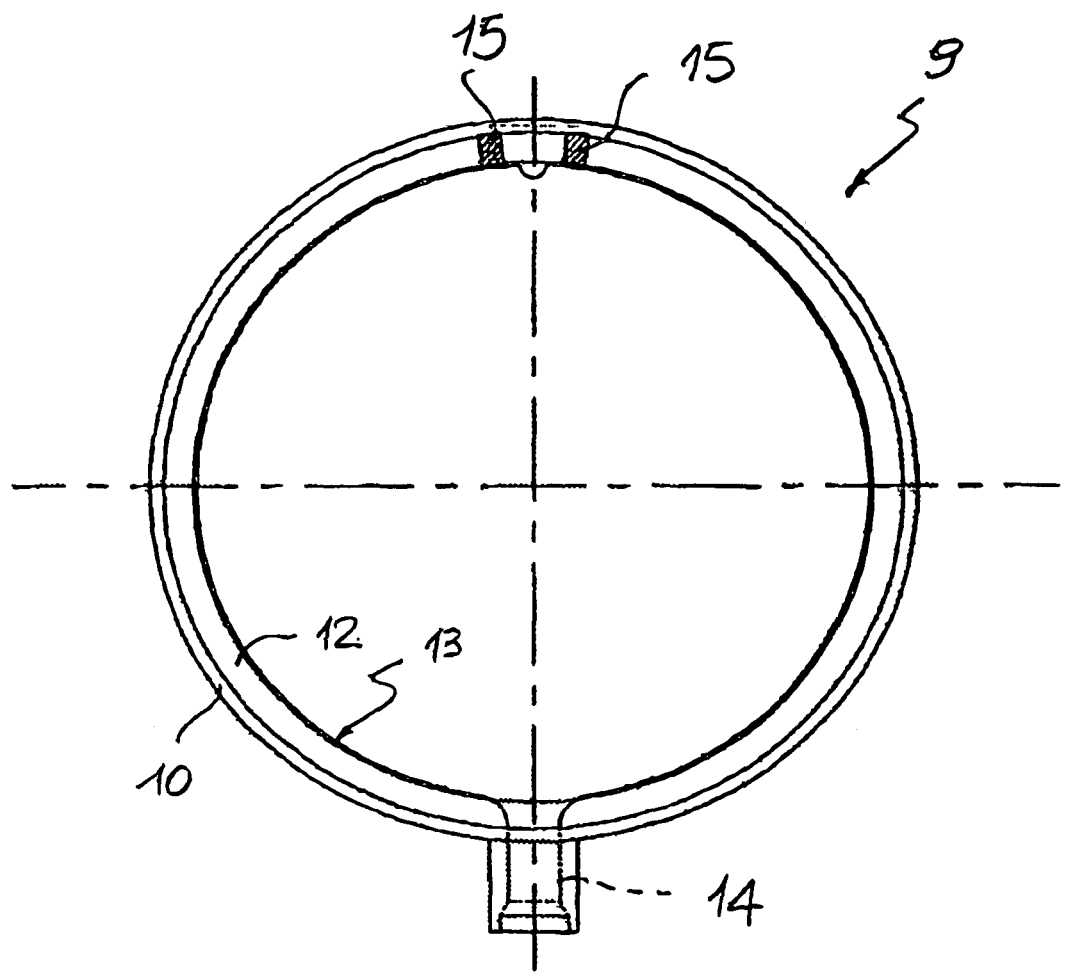
FIG. 2 is a front elevational view of a gasket useable in a mold suitable for manufacturing the polarized optical element shown in FIG. 1.

FIG. 2 shows a gasket 9 which finds a preferred use in a mold assembly (not shown) suitable for manufacturing the polarized optical element 1 illustrated above. The gasket 9 is substantially annularly shaped. An external ring 10 holds the glass molds (concave and convex parts) in position and an internal ring 12 spaces the glass molds apart and seals them. A groove 13 in the internal ring section holds the polarizing film 3 (not shown) in place. In order to fill the mold and to evacuate air a funnel 14 and vents 15 are positioned at opposite sides of the gasket 9.

The following examples further illustrate preferred embodiments of the method and of the polarized optical element of this invention. The invention, which is set forth in the foregoing disclosure is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLE 1

Prior Art

A set of 100 polarized optical elements in the form of planar sheets having a thickness of 3.0 mm were obtained by means of a casting method comprising placing a freestanding polyvinyl alcohol polarizing film having a thickness of 30 microns (Kurarai, JP) in a mold cavity formed by glass plates.

The glass plates were suitably spaced apart by rubber gaskets so as to define a mold cavity having a thickness of 1.5 mm. The gaskets are used to seal the mold cavity and to hold the polarized film between them in a sandwich configuration in the middle of the section of the cavity itself.

The liquid-phase polyurethane-based optical material containing free —NCO functional groups used to manufacture the optical elements comprised the following components:

Component A): liquid polyisocyanate prepolymer having an —NCO group content of 11% (SIM2020 commercially available from Simula Inc., USA).

Component B): 1-methyl-3,5-diethyl-2,4- and/or -2,6-diaminobenzene (also known as 3,5-diethyl-2,4- and/or -2,6-toluenediamine) or DETDA available from Albemarle with the trade name of ETHACURE® 100.

The two components were processed using a commercially available two-component urethane processor machine.

The casting parameters are listed in the following Table 1.

TABLE 1

|  |  | Temperature | Viscosity | Exothermal peak[1] | Flow rate (total A + B) |
|---|---|---|---|---|---|
| Component A) | SIM2020 | 60° C. | 2000 Mpa · s | 129° C. | 80 g/min |
| Component B) | DETDA | 23° C. | 150 Mpa · s |  |  |

[1] Measured using the procedure described in the ASTM 2471-99 standard. Volume of resin: 100 ml, mixed by mechanical device, thickness 25 mm.

EXAMPLE 2

Invention

A set of 100 polarized optical elements in the form of planar sheets having a thickness of 3.0 mm were obtained by means of the casting method described in Example 1.
The materials used were the following:
polarizing film: freestanding polyvinyl alcohol film having a thickness of 30 microns (Kurarai, JP)
liquid-phase polyurethane-based optical material:
Component A): SIM2020 commercially available from Simula Inc.
Component B): DETDA available from Albemarle with the trade name of ETHACURE® 100.
Component C) (organometallic catalyst): dibutyltin dilaurate (DBTDL)

The catalyst was added to Component B) by stirring under nitrogen blanket at a concentration of 0.11% by weight on the total weight of Component B).

The two components were processed using a commercially available two-component urethane processor machine according to the same procedure of Example 1.

No displacement of the freestanding polarizing film occurred during the admission of the liquid-phase polyurethane-based optical material into the mold cavity. Additionally, no harmful effects on the polarizing film due to the exothermic curing reaction were observed.

The casting parameters are listed in the following Table 2.

The liquid-phase polyurethane-based optical material used comprised the following components:
Component A): liquid polyisocyanate prepolymer obtained by reacting the following polycaprolactones:
  a) 0.86 equivalents of a polycaprolactone polyol having a number average molecular weight of 400, a functionality of 2 and a hydroxyl number of 280.5 mg KOH/g (commercially available under the trade name of TONE® 32B8-Dow Corporation);
  b) 0.12 equivalents of a linear polycaprolactone polyol having a number average molecular weight of 750, a functionality of 2 and a hydroxyl number of 149.6 mg KOH/g (commercially available under the trade name of TONE® 32C8—Dow Corporation);
  c) 0.018 equivalents of a linear polycaprolactone polyol having a number average molecular weight of 4000, a functionality of 2 and a hydroxyl number of 28.1 mg KOH/g (commercially available under the trade name of TONE® 1278—Dow Corporation);

with 5.4 equivalents of 4,4'-dicyclohexylmethane diisocyanate.
Component B): liquid curative obtained by mixing the following polycaprolactones:
  a) 0.94 equivalents of TONE® 32B8 (Dow Corporation);
  b) 0.06 equivalents of TONE® 32C8 (Dow Corporation);
  c) 0.046 equivalents of TONE® 1278 (Dow Corporation);
  and 4.1 equivalents of the aromatic diamine DEDTA sold by Albemarle with the trade name of ETHACURE® 100.

TABLE 2

|  |  | Temperature | Viscosity | Exothermal peak[1] | Flow rate (total A + B) |
|---|---|---|---|---|---|
| Component A) | SIM2020 | 60° C. | 2000 Mpa · s | 129° C. | 80 g/min |
| Components B) and C) | DETDA + (0.1% DBTDL) | 23° C. | 150 Mpa · s |  |  |

[1] Measured using the procedure described in the ASTM 2471-99 standard. Volume of resin: 100 ml, mixed by mechanical device, thickness 25 mm.

EXAMPLE 3

Invention

A set of 100 polarized lenses were obtained by means of a casting method comprising placing a freestanding polarizing disc made of a polyvinylalcohol film having a thickness of 30 microns (Kurarai, JP) preformed to have a substantially spherical surface in a mold cavity formed by mold parts having concave and convex inner surfaces. The mold cavity is sealed using a gasket which is designed to hold the polarizing disk in the middle of the section of the cavity itself.

Component C) (organometallic catalyst): dibutyltin dilaurate (DBTDL).

The catalyst was added to Component B) by stirring under nitrogen blanket at a concentration of 0.1% by weight on the total weight of Component B).

The two components were processed using a commercially available two-component urethane processor machine according to the same procedure of Example 1.

No displacement of the freestanding polarizing film occurred during the admission of the liquid-phase polyurethane-based optical material into the mold cavity. Additionally, no harmful effects on the polarizing film due to the exothermic curing reaction were observed.

The casting parameters are listed in the following Table 3.

TABLE 3

|  |  | Temperature | Viscosity | Exothermal peak[1] | Flow rate (total A + B) |
|---|---|---|---|---|---|
| Component A) | Example 3, Comp. A | 60° C. | 150 Mpa · s | 165° C. | 80 g/min |
| Components B) and C) | Example 3, Comp. B + (0.1% DBTDL) | 60° C. | 125 Mpa · s |  |  |

[1]Measured using the procedure described in the ASTM 2471-99 standard. Volume of resin: 100 ml, mixed by mechanical device, thickness 25 mm.

EXAMPLE 4

Invention

A set of 100 polarized lenses were obtained by means of a casting method comprising placing a freestanding polarizing disc made of a polyvinylalcohol film having a thickness of 30 microns (Kurarai, JP) preformed to have a substantially spherical surface in a mold cavity formed by mold parts having concave and convex inner surfaces. The mold cavity is sealed using a gasket which is designed to hold the polarizing disk in the middle of the section of the cavity itself.

The polarizing film was previously treated by dipping the same in a solution of aminosilane (10% in ethanol) and then heating at 80° C. so as to cause the aminosilane to react with the film thereby to silylate both surfaces of the film.

The liquid-phase polyurethane-based optical material used was the same described in Example 3.

The catalyst was added to Component B) by stirring under nitrogen blanket at a concentration of 0.1% by weight on the total weight of Component B).

The two components were processed using a commercially available two-component urethane processor machine according to the same procedure of Example 1.

No displacement of the freestanding polarizing film occurred during the admission of the liquid-phase polyurethane-based optical material into the mold cavity. Additionally, no harmful effects on the polarizing film due to the exothermic curing reaction were observed.

The casting parameters are listed in the following Table 4.

The UV lamp has a maximum peak at 340 nm of irradiance 0.75 W/m²/nm. The lens surface temperature reaches about 55° C., the humidity level during the humidity cycle is very close to saturation.

To pass the test, no visible delamination should occur at the interface between the polarizing film and the lens forming material. Slight discoloration close to the edges may be allowed.

Thermal Shock Test

This test is an accelerated aging test consisting in a cyclic alternate exposure to different temperatures. The sample is hold at −20° C. for 4 hours and then conditioned at ambient temperature for 4 hours. This procedure is repeated 5 times.

To pass the test, no visible delamination should occur at the interface between the polarizing film and the lens forming material.

Weathering Test

This test consists in outdoor exposure for a predetermined period of time. In the present case, the optical elements were exposed outdoor for 60 days at Lat 44°50'47"N and Long. 10°21'39"E during the months of June and July.

To pass the test, no visible delamination should occur at the interface between the polarizing film and the lens forming material. Slight discoloration close to the edges may be allowed.

Wedge Test

This test consists in forcing a suitably shaped wedge element at the interface between the polarizing film and the lens forming material so as to assess whether delamination occur between the polarizing film and the lens forming material.

TABLE 4

|  |  | Temperature | Viscosity | Exothermal peak[1] | Flow rate (total A + B) |
|---|---|---|---|---|---|
| Component A) | Example 3 Comp. A | 60° C. | 150 Mpa · s | 165° C. | 80 g/min |
| Components B) and C) | Example 3 Comp. B + (0.1% DBTDL) | 60° C. | 125 Mpa · s |  |  |

[1]Measured using the procedure described in the ASTM 2471-99 standard. Volume of resin: 100 ml, mixed by mechanical device, thickness 25 mm.

EXAMPLE 5

Delamination Tests

A number of tests were performed on the optical elements manufactured in accordance with Examples 1-4 so as to verify the adhesion properties of the polarizing film. More specifically, the following tests were carried out.

Q-UV-Panel Test

This test is an accelerated aging test well known in the field of plastic materials and consists in an alternate exposure to an UV irradiation cycle and a humidity cycle. Every cycle is 4 hours long and the whole test is 120 hours long (15 UV and Humidity cycles).

In the present case, the edge of the optical elements to be tested was milled using a shaped mill suitable to achieve a round-shaped groove with a diameter of 1.5 mm. The milling was achieved using a conventional machine for cutting and edging the eyewear lenses and the groove was formed at the interface between the polarizer and the lens material. Then, the optical elements were pressed on a metallic steel bar having a diameter of 1.0 mm in such a way that the bar is housed in the groove formed in the edge.

To pass the test, no visible delamination should occur at the interface between the polarizing film and the lens forming material.

The results of the delamination tests carried out are shown in the following Table 5. In all the tests, only the optical elements showing no statistical delamination (i.e. not more than 1% of the total number of tested optical elements failed the test) were marked a "PASS" rate.

TABLE 5

| Example No. | Q-UV Panel | Weathering | Thermal Shock test | Wedge test |
|---|---|---|---|---|
| 1 (prior art) | Fail | Fail | Fail | Fail |
| 2 (invention) | Pass | Pass | Pass | Fail |
| 3 (invention) | Pass | Pass | Pass | Fail |
| 4 (invention) | Pass | Pass | Pass | Pass |

In view of the preceding description, it may be appreciated that an improved method of manufacturing high impact polarized optical elements and that improved polarized optical elements including an integrally bonded polarizing film are provided by the present invention.

The optical elements comprise a high impact, lightweight, high optical quality polyurethane construct and a polarizing film integrally and stably bonded to the construct. The construct may be a lens substrate wherein the polarizer is integrally bonded at or near the front surface of the lens substrate or at any desired location between the outer surfaces of the optical element. A sidefill gasket may be used to support and position the polarizer within a mold cavity for reproducibly forming the optical element.

The polarizing film may comprise a freestanding PVA film, a freestanding PET film or multi-layered structures including such films.

The polarized optical element has improved impact resistance over conventional thermoset resin elements, better optical properties than similarly impact-resistant polycarbonate constructs as well as improved adhesion properties of the polarizing film to the polyurethane construct.

Also, a polarized optical element including a freestanding PVA polarizing film may be reliably and reproducibly be manufactured without observing any displacement of the freestanding polarizing film during the admission of the liquid-phase polyurethane-based optical material into the mold cavity and without observing any harmful effects on the polarizing film due to the exothermic curing reaction.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

We claim:

1. A method of manufacturing a polarized optical element comprising the steps of:
   providing a polarizing film comprising free hydroxyl groups;
   placing the polarizing film within a mold cavity;
   admitting into the mold cavity a liquid-phase polyurethane-based optical material containing —NCO functional groups reactive with said hydroxyl groups and comprising the following components:
   A) a liquid polyisocyanate or polyisocyanate prepolymer having a content of —NCO functional groups comprised between 5 and 50% by weight and an average functionality of 2 to 3,
   B) an isocyanate-reactive component comprising at least one organic compound containing at least two aromatic amine groups, and
   C) at least one organometallic catalyst;
   curing the liquid-phase polyurethane-based optical material to form a polarized optical element.

2. A method according to claim 1, wherein the polarizing film comprises a PVA film.

3. A method according to claim 1, wherein the polarizing film comprises a PET film.

4. A method according to claim 1, wherein the polarizing film is a free standing polarizing film having a thickness of from 20 to 400 mm.

5. A method according to claim 1, further comprising the step of treating the polarizing film for promoting reaction of the liquid-phase polyurethane-based optical material with the polarizing film.

6. A method according to claim 5, wherein the treating step of the polarizing film comprises applying on at least one surface of the film a reactive coating comprising functional groups reactive with the —NCO functional groups of the liquid-phase polyurethane-based optical material.

7. A method according to claim 6, wherein the reactive coating comprises a material selected from the group consisting of polyurethanes, aminosilanes and epoxysilanes.

8. A method according to claim 7, wherein the treating step of the polarizing film comprises contacting at least one surface of the film with an aminosilane or an epoxysilane and causing the aminosilane or the epoxysilane to react with the film.

9. A method according to claim 5, wherein the treating step of the polarizing film comprises physically treating at least one surface of the film by plasma exposure or by irradiation with UV light rays.

10. A method according to claim 5, wherein the treating step of the polarizing film comprises mechanically treating at least one surface of the film by forming grooves therein or by roughening.

11. A method according to claim 1, further comprising the step of bonding a transparent plastic film to at least one side of the polarizing film.

12. A method according to claim 11, wherein the total thickness of the polarizing film and the transparent plastic film is comprised between 0.1 and 1.2 mm.

13. A method according to claim 11, wherein the transparent plastic film is made of a material selected from the group consisting of polycarbonate, poly(methyl methacrylate), polystyrene, acetobutyrrate, cellulose acetate, cellulose triacetate and polyamide.

14. A method according to claim 1, wherein the polarizing film has a degree of polarization P equal to at least 45% as measured according to European Standard EN 1836.

15. A method according to claim 1, wherein the liquid-phase polyurethane-based optical material comprises the following components:
   A) a liquid polyisocyanate or polyisocyanate prepolymer having a content of —NCO functional groups comprised between 5 and 50% by weight, an average functionality of 2 to 3, a viscosity of less than 5,000 mPa·s at 25° C., and comprising the reaction product of:
      (1) from 20 to 100% by weight, based on 100% by weight of A), of a (cyclo)aliphatic polyisocyanate having a content of —NCO functional groups of from 32% to 50% by weight and a functionality of about 2, wherein said (cyclo)aliphatic polyisocyanate is selected from the group consisting of 4,4'-dicyclohexylmethane diisocyanate (rMDI), 1,6-hexamethylene diisocyanate (HDI), isophorone diisocyanate (IPDI), 1,4-cyclohexane diisocyanate (CHDI), m-tetramethylxylene diisocyanate (m-TMXDI), and mixtures thereof; and
      (2) from 0 to 80% by weight, based on 100% by weight of A), of at least one organic compound having at least two hydroxyl groups, and a molecular weight of from 62 to 8,000;

and

B) an isocyanate-reactive component comprising:
1) from 3% to 90% by weight, based on 100% by weight of component B), of at least one organic compound containing at least two aromatic amine groups, and having a molecular weight of from 100 to 1,000; and
2) from 10% to 97% by weight, based on 100% by weight of component B), of at least one organic compound having at least two hydroxyl groups and a molecular weight of from 62 to 6,000.

16. A method according to claim 15, wherein said component A) has a viscosity comprised between 650 and 2500 mPa·s at 25° C.

17. A method according to claim 15, wherein said component B) has a viscosity comprised between 150 and 700 mPa·s at 25° C.

18. A method according to claim 15, wherein the components of the liquid-phase polyurethane-based optical material are admitted into the mold at an isocyanate index of 95 to 120.

19. A method according to claim 15, wherein the components of the liquid-phase polyurethane-based optical material are processed at a temperature comprised between 20° C. and 90° C.

20. A method according to claim 15, wherein said liquid polyisocyanate or polyisocyanate prepolymer comprises the reaction product of A)(1) a (cyclo)aliphatic polyisocyanate comprising 4,4'-dicyclohexylmethane diisocyanate, with A)(2) at least one organic compound having at least two hydroxyl groups and a molecular weight of from 62 to 8,000.

21. A method according to claim 15, wherein said aromatic diamines B)(1) are free of ether groups and/or ester groups.

22. A method according to claim 15, wherein said organic compound B)(1) containing aromatic amine groups comprises an amine-terminated polyether wherein the amine-terminating groups are aromatic amine groups.

23. A method according to claim 15, wherein said organic compound B)(1) is selected from the group consisting of an isomer of diethyltoluenediamine, a mixture of isomers of diethyltoluenediamine, an isomer of dimethylthiotoluenediamine, and a mixture of isomers of dimethylthiotoluenediamine.

24. A method according to claim 15, wherein said organic compound B)(2) having at least two hydroxyl groups has a functionality of about 3 or less.

25. A method according to claim 15, wherein said organic compound B)(2) having at least two hydroxyl groups comprises a low molecular weight glycol.

26. A method according to claim 25, wherein said low molecular weight glycol has a molecular weight less than 500.

27. A method according to claim 15, wherein said organic compound B)(2) having at least two hydroxyl groups comprises a high molecular weight polyol.

28. A method according to claim 27, wherein said high molecular weight polyol has a molecular weight greater than 500.

29. A method according to claim 15, wherein said organic compound B)(2) having at least two hydroxyl groups comprises a mixture of a glycol and a polyol.

30. A method according to claim 1, wherein the liquid-phase polyurethane-based optical material comprises the following components:

A) a liquid polyisocyanate prepolymer having a content of —NCO functional groups comprised between 5 and 50% by weight and an average functionality of 2 to 3, and comprising the reaction product of
(1) an aliphatic or cycloaliphatic diisocyanate; and
(2) at least one —OH containing intermediate having a weight average molecular weight of from 400 to 2000 selected from the group consisting of polyester glycols, polycaprolactone glycols, polyether glycols, polycarbonate glycols, and mixtures thereof in an equivalent ratio of 2.5 to 4.5 NCO/1.0 OH;

and

B) an isocyanate-reactive component comprising:
1) at least one aromatic diamine curing agent selected from the group consisting of 2,4-diamino-3,5-diethyl-toluene, 2,6-diamino-3,5-diethyl-toluene, the compounds having the formula:

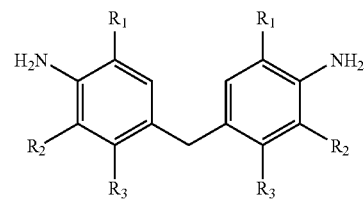

wherein R1 and R2 are each independently selected from the group consisting of methyl, ethyl, propyl and isopropyl groups, and R3 is selected from the group consisting of hydrogen and chlorine, and mixtures thereof 31. A method according to claim 30, wherein the components A) and B) of the liquid-phase polyurethane-based optical material are admitted into the mold at an equivalent ratio of 0.85 to 1.02 NH2/1.0 NCO.

32. A method according to claim 30, wherein the diisocyanate is selected from the group consisting of 4,4'-methylenebis(cyclohexyl isocyanate), 3-isocyanato-methyl-3,5,5-trimethylcyclohexyl-isocyanate, metatetramethylxylene diisocyanate, and mixtures thereof.

33. A method according to claim 30, wherein the cycloaliphatic diisocyanate is an isomeric mixture of 4,4'-methylenebis(cyclohexyl isocyanate) which comprises at least 20 percent of the trans,trans isomer of 4,4'-methylenebis(cyclohexyl isocyanate).

34. A method according to claim 30, wherein the weight average molecular weight of the OH-containing intermediate is from 400 to 2000.

35. A method according to claim 30, wherein the OH-containing intermediate is selected from the group consisting of: (a) esterification products of adipic acid with one or more diols selected from the group consisting of 1,4-butanediol, 1,6-hexanediol, neopentyl glycol, and 1,10-decanediol; (b) reaction products of E-caprolactone with one or more diols selected from the group consisting of 1,4-butane diol, 1,6-hexane diol, neopentyl glycol, and 1,10-decanediol; (c) polytetramethylene glycol; (d) aliphatic polycarbonate glycols; and (e) mixtures of such OH-containing intermediates.

36. A method according to claim 1, wherein said at least one organometallic catalyst comprises a tin catalyst.

37. A method according to claim 36, wherein said tin catalyst comprises an organic tin(IV) catalyst.

38. A method according to claim 37, wherein said organic tin catalyst is selected from the group consisting of dibutyltin dilaurate, dimethyltin dilaurate and mixtures thereof 39. A method according to claim 1, further comprising the step of adding to the liquid-phase polyurethane-based optical material at least one additive selected from the group consisting of: surface-active additives, light stabilizers, heat stabilizers, antioxidants, ultraviolet light absorbers, antiyellowing additives, mold release agents, dyes, pigments, flexibilizing additives, and mixtures thereof.

40. A method according to claim 1, wherein the optical element is formed by admitting the liquid-phase polyurethane-based optical material about one side of the polarizing film

41. A method according to claim 1, wherein the optical element is formed by admitting the liquid-phase polyurethane-based optical material about each side of the polarizing film.

42. A method according to claim 41, wherein the optical element is formed by simultaneously admitting the liquid-phase polyurethane-based optical material about each side of the polarizing film.

43. A method according to claim 1, further comprising the step of post curing the polarized optical element for at least 6 hours at a temperature of at least 90° C.

44. A method according to claim 1, further comprising the step of applying a scratch-resistant or hard coating on at least one side of the polarized optical element.

45. A method according to claim 1, further comprising the step of applying a tintable coating, a reflective coating, an antireflective coating or a hydrophobic coating, or any combination thereof, on at least one side of the polarized optical element.

46. A method according to claim 45, comprising the step of applying an antireflective coating comprising a monolayer or multilayer of metal oxides or metal fluorides on at least one side of the polarized optical element.

* * * * *